(12) United States Patent
Acosta

(10) Patent No.: US 7,443,072 B2
(45) Date of Patent: Oct. 28, 2008

(54) BRUSH CARD FOR WINDOW LIFT MOTORS

(75) Inventor: Louis E. Acosta, Lawrenceville, GA (US)

(73) Assignee: Brose Fahrzeugteile GmbH & Co. Kommanditgesellschaft, Wurzburg, Wurzburg (DE)

( * ) Notice: Subject to any disclaimer, the term of this patent is extended or adjusted under 35 U.S.C. 154(b) by 0 days.

(21) Appl. No.: 11/506,831

(22) Filed: Aug. 21, 2006

(65) Prior Publication Data

US 2007/0126311 A1 Jun. 7, 2007

Related U.S. Application Data

(60) Provisional application No. 60/748,058, filed on Dec. 7, 2005.

(51) Int. Cl.
*H02K 13/00* (2006.01)

(52) U.S. Cl. .................................................. 310/239

(58) Field of Classification Search .............. 310/239, 310/240, 241
See application file for complete search history.

(56) References Cited

U.S. PATENT DOCUMENTS

| 3,739,205 | A | * | 6/1973 | Winkelmann | 310/42 |
| 3,924,147 | A | * | 12/1975 | Tarnow et al. | 310/68 R |
| 5,696,418 | A | * | 12/1997 | Corbach et al. | 310/239 |
| 6,809,454 | B2 | * | 10/2004 | Adachi | 310/239 |

* cited by examiner

*Primary Examiner*—Nguyen N Hanh
(74) *Attorney, Agent, or Firm*—Manelli Denison & Selter PLLC; Edward J. Stemberger

(57) ABSTRACT

A brush card assembly 10 includes a brush card member 12, conductive contacts 14 provided on the brush card member, and brushes 16 mounted to be electrically in contact with the conductive contacts. The assembly 10 also includes brush box 18 associated with each of the brushes. Each brush box includes an integral spring 24 constructed and arranged to bias an associated brush to contact a commutator, and an integral retainer 26 constructed and arranged to exert pressure on the associated brush once the brush is disengaged from the commutator.

20 Claims, 6 Drawing Sheets

BRUSH CARD FOR WINDOW LIFT MOTORS

This application claims the benefit of the earlier filing date of U.S. Provisional Application No. 60/748,058, filed on Dec. 7, 2005, which is incorporated by reference herein in its entirety.

FIELD OF THE INVENTION

The invention relates to window lift motors for vehicles and, more particularly, to brush card assemblies for such motors.

BACKGROUND OF THE INVENTION

Brush card assemblies for window lift motors include many components. For example, a separate spring and retainer is typically associated with each brush. Each brush is provided in a brush box. Also, shunts are typically provided for each brush. There is a need to provide a brush card assembly for a window lift motor that reduces overall cost by combining functions typically performed by specific components into other components of the assembly.

SUMMARY OF THE INVENTION

An object of the invention is to fulfill the need referred to above. In accordance with the principles of the present invention, this objective is achieved by providing a brush card assembly including a brush card member, conductive contacts provided on the brush card member, brushes mounted to be electrically in contact with the conductive contacts and a brush box associated with each of the brushes. The brush box includes an integral spring constructed and arranged to bias the associated brush to contact a commutator, and an integral retainer structure constructed and arranged to exert pressure on the associated brush once the brush is disengaged from the commutator.

In accordance with another aspect of the invention, a brush box assembly is provided for a brush motor. The assembly includes a brush constructed and arranged to contact a commutator of a motor, and a brush box receiving the brush. The brush box includes an integral spring constructed and arranged to bias the brush to contact the commutator. The brush box includes an integral retainer structure constructed and arranged to exert pressure on the brush once the brush is disengaged from the commutator.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 7:
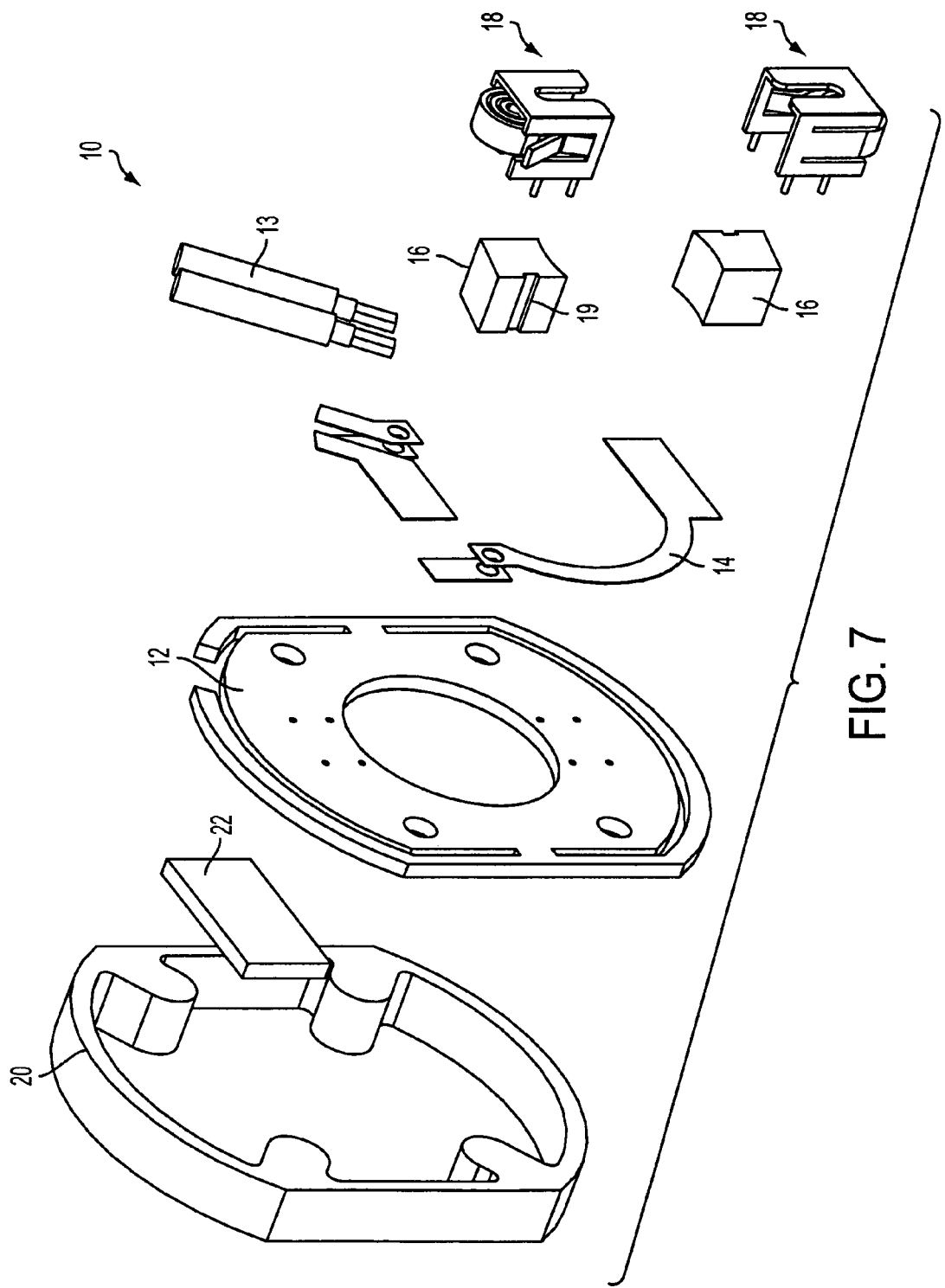
FIG. 7 is an exploded view of the brush card assembly of FIG. 1.
Figure 10:
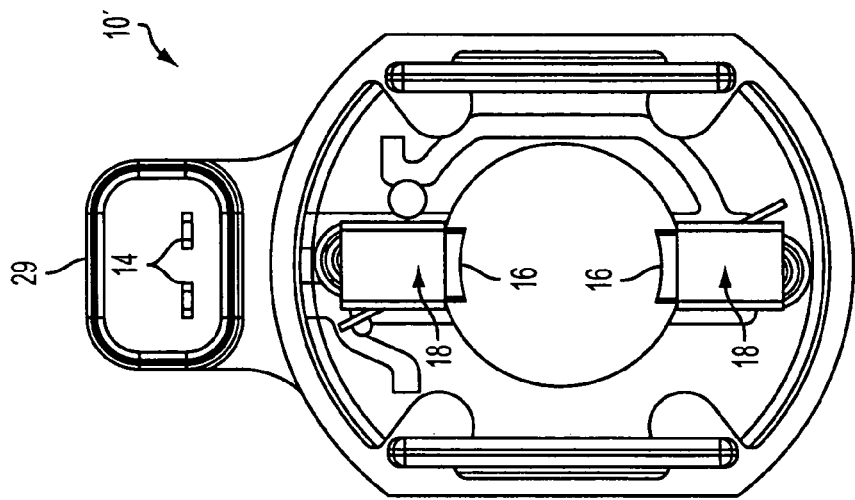
FIG. 10 is a front view of the of the brush card assembly of FIG. 8.
Figure 9:
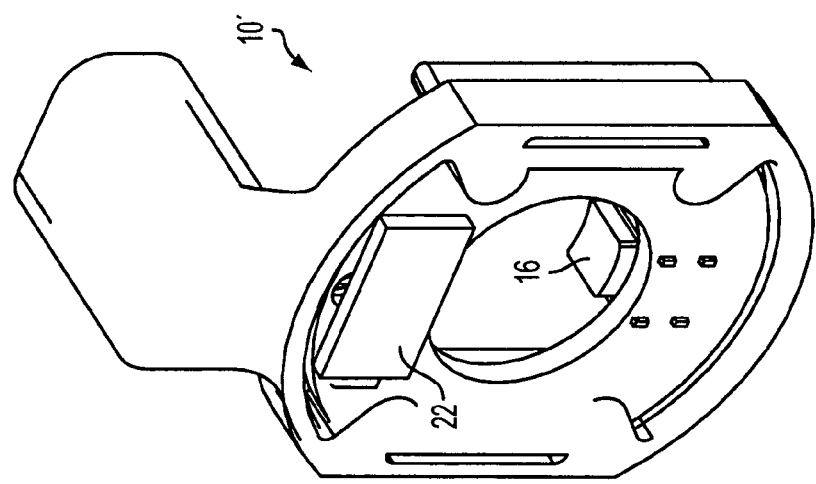
FIG. 9 is a rear view of the brush card assembly of FIG. 8.
Figure 8:
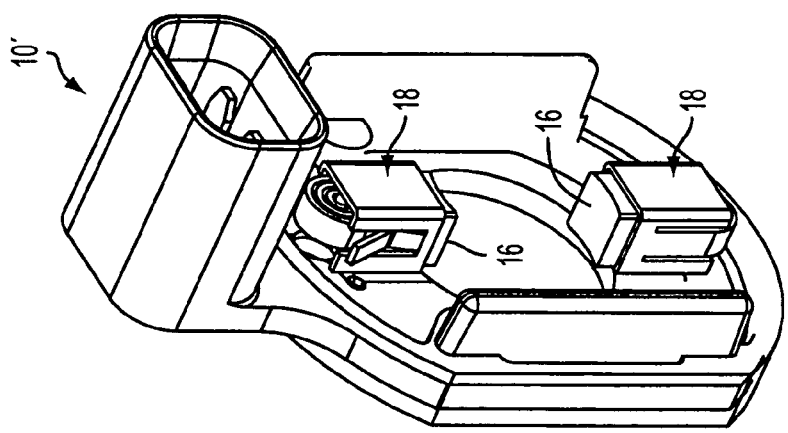
FIG. 8 a perspective view of a brush card assembly provided in accordance with another embodiment of the invention.

A brush card assembly is shown, generally indicated at 10, in FIGS. 1-3 and 7 in accordance with the principles of the present invention. With reference to FIG. 7, the brush card assembly 10 includes a brush card member 12 that is preferably a printed circuit board (PCB) or a molded member. PCB conductive traces or insert molded conductive contacts 14 are provided on the member 12. Power cables 13 are electrically connected to the traces 14 to power the assembly 10. Brushes 16, without shunts, are mounted on the traces 14. A brush box, generally indicated at 18, is associated with each brush 16, the function of which will be explained below.

The brush card assembly 10 also includes a seal 20 and a thermal breaker 22 or positive temperature coefficient (PTC) resistivity element associated with the traces 14. The seal 20 defines a support for the brush card member 12 with respect to the rest of the motor. The seal 20 is preferably composed of an elastomer such as rubber that surrounds the brush card member 12 and provides both sealing of the periphery of the member 12 and vibration dampening to reduce noise.

Figure 3:
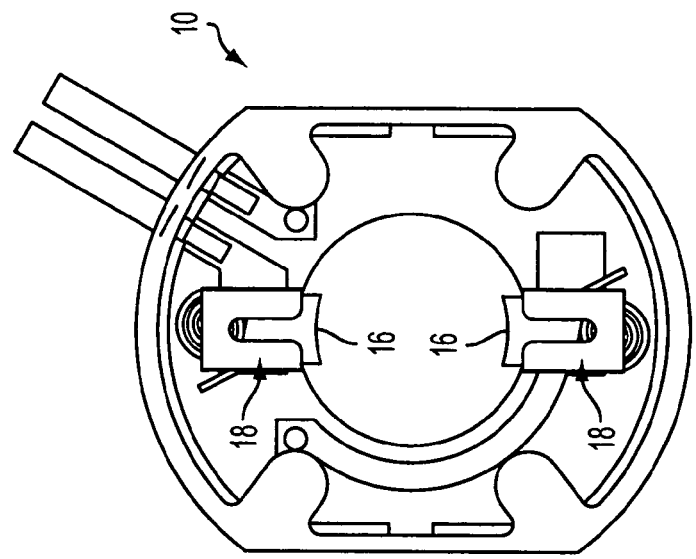
FIG. 3 is a front view of the of the brush card assembly of FIG. 1.
Figure 2:
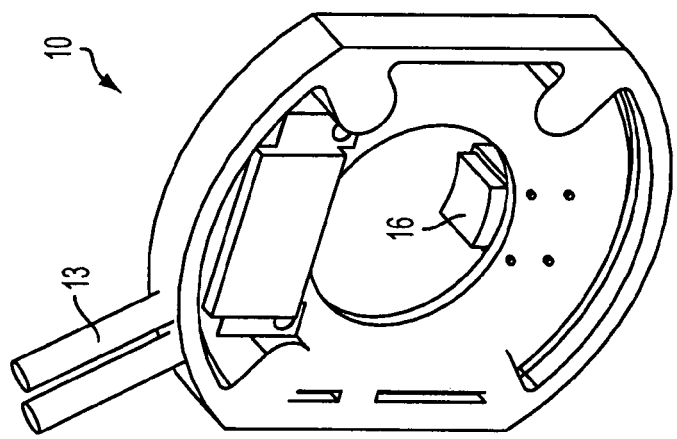
FIG. 2 is a rear view of the brush card assembly of FIG. 1.
Figure 1:
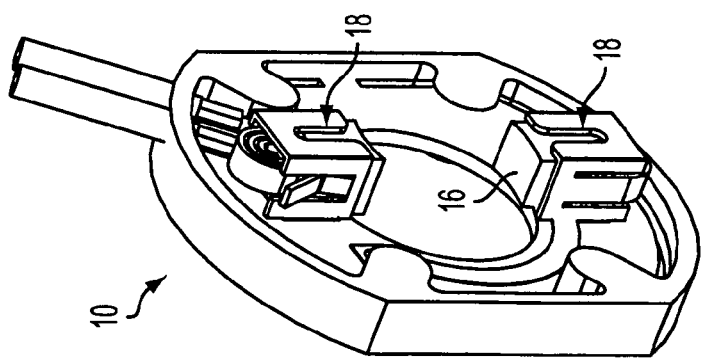
FIG. 1 a perspective view of a brush card assembly provided in accordance with the principles of the invention.
Figure 4:
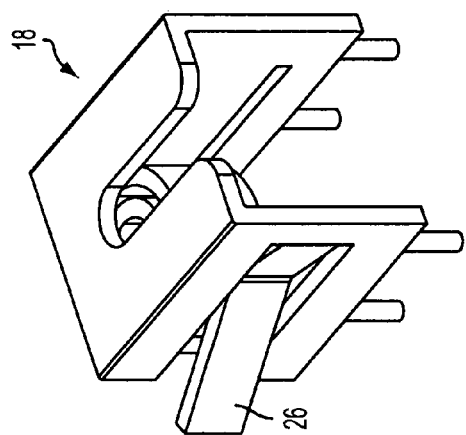
FIG. 4 is a front perspective view of a brush box of the brush card assembly of FIG. 1.
Figure 6:
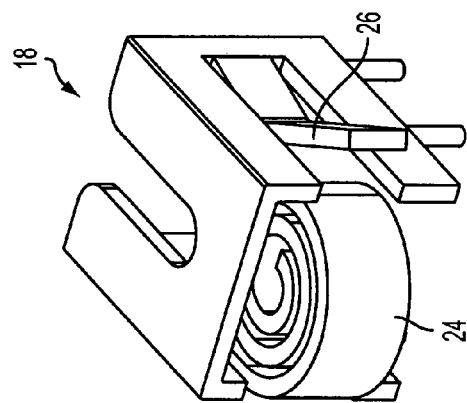
FIG. 6 is a rear perspective view of view of the brush box of the brush card assembly of FIG. 1.
Figure 5:
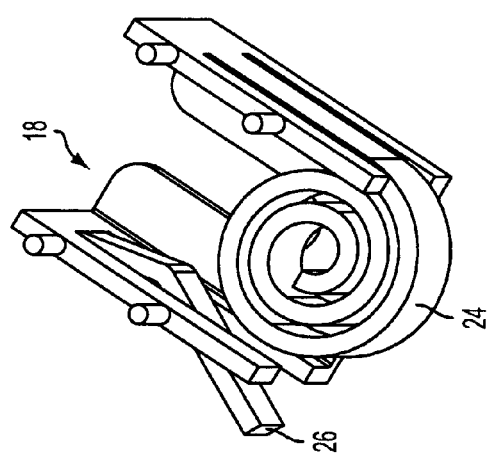
FIG. 5 is a bottom view of the brush box of FIG. 4.

As best shown in FIGS. 4-6, the brush box 18 includes an integral spring 24 and retainer structure the brush box body, eliminating the need for conventional separate springs (e.g., typically 2 in total) and a separate brush retainer. Each spring 24 biases a brush 16 towards a commutator (not shown). As noted above, each brush box 18 includes an integral retainer structure. In the embodiment, the retainer structure is in the form of a generally V-shaped resilient arm 26 that exerts lateral pressure on the associated brush 16 once disengaged from the commutator. This minimizes arcing between the brush 16 and brush box 18. The apex of each V-shaped arm 26 preferably engages a slot 19 defined in the brush 16 to ensure engagement with the brush 16. It can be appreciated that the brush box 18 with integral spring 24 and retainer structure 26 can be manufactured as a single part.

The PCB conductive traces 14 replace wire jumpers which, in conventional brush cards, are welded to their respective contact points. Conventional brush cards also utilize shunts. In the embodiment, the brush box 18 and conductive traces 14 provide an electrical connection for the brush 16 without shunts.

Figure 13:
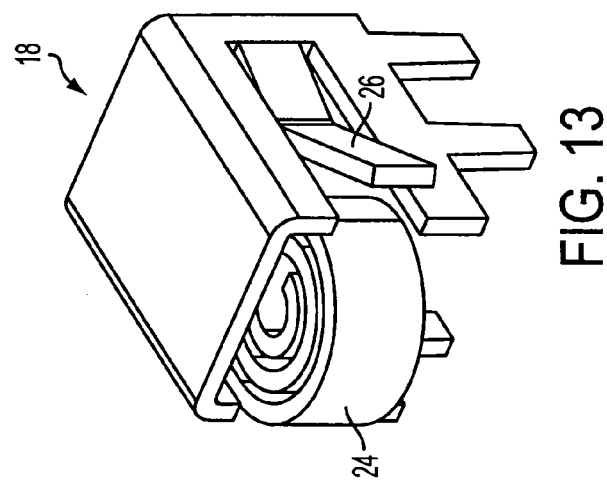
FIG. 13 is a rear perspective view of view of the brush box of the brush card assembly of FIG. 8.
Figure 11:
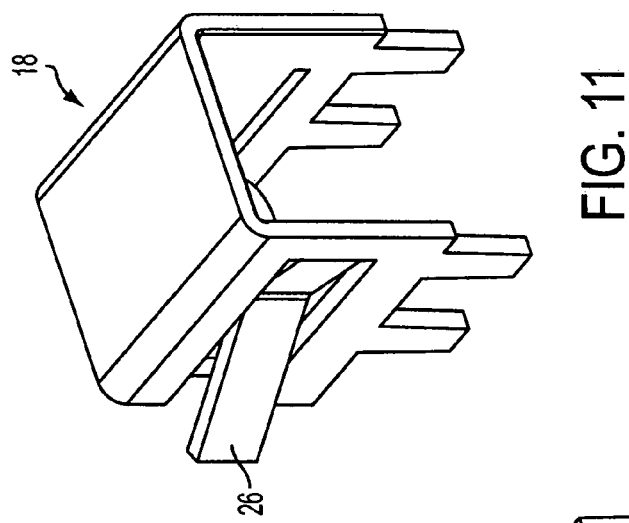
FIG. 11 is a front perspective view of a brush box of the brush card assembly of FIG. 8.
Figure 12:
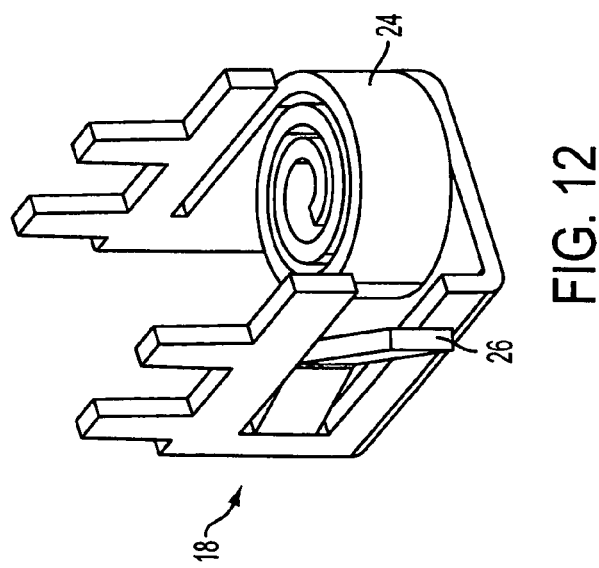
FIG. 12 is a bottom view of the brush box of FIG. 11.
Figure 14:
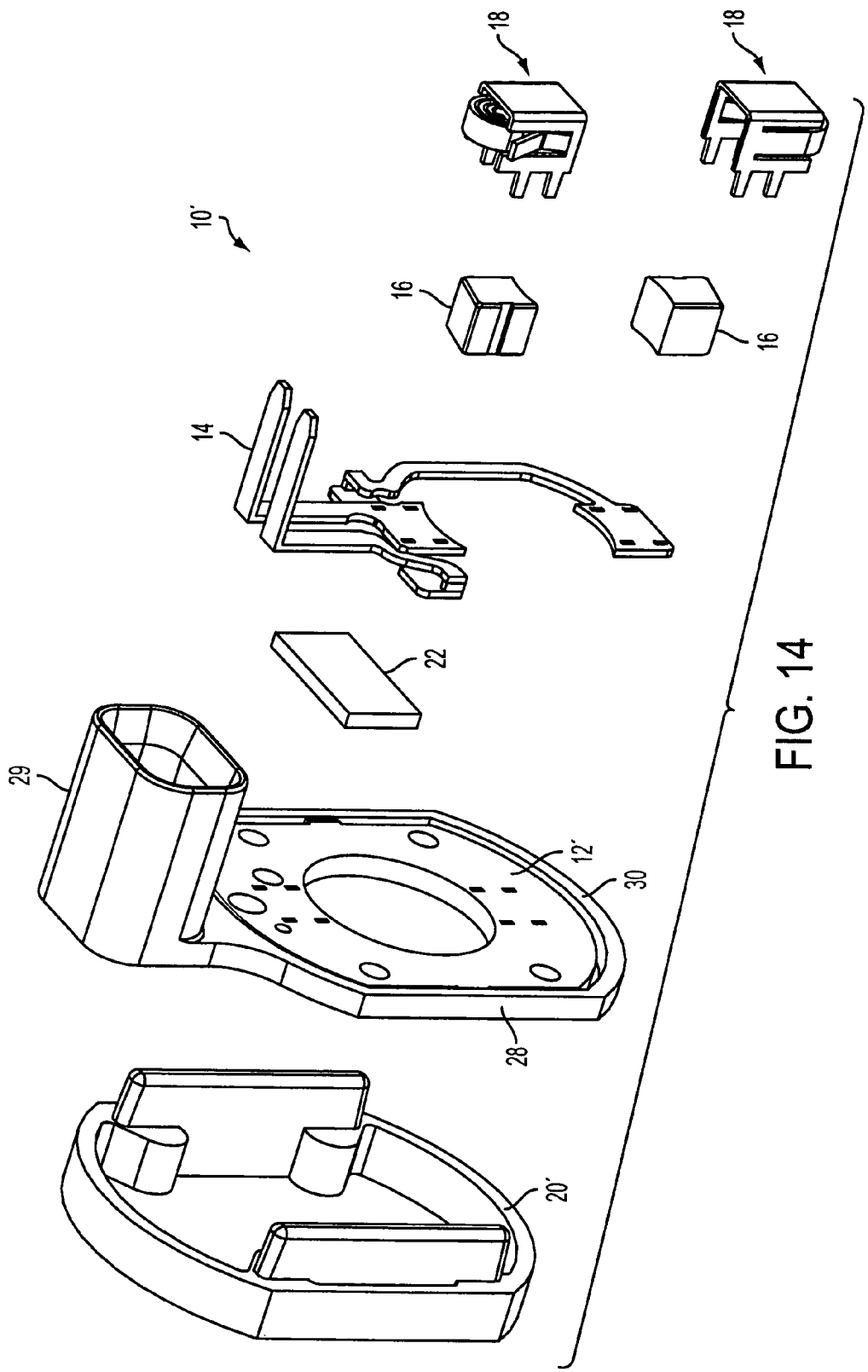
FIG. 14 is an exploded view of the brush card assembly of FIG. 8.

FIGS. 8-10 and 14 show another embodiment of the brush card assembly 10'. The brush box 18 is shown in FIGS. 11-13. In this configuration, a contact frame 28 is preferably insert molded to produce the brush card member 12' with a cover 29 over contacts 14. The seal/dampener structure 20' is preferably insert molded and the brush boxes 18, brushes 16, and thermal protector 22 are then assembled. The brush card member 12' is detached from an outer rib 30 that is encapsulated by the rubber seal 20'. The terminal frame 14 is punched out to provide the individual electrical paths (after insert molding).

Thus, a simplified brush card assembly 10, 10' is provided with the following main features:
- Brush boxes which incorporate a coiled spring and brush retainer
- Brush card plate utilizing PCB technology or insert molded terminals into a plastic structure
- Brushes may not require shunts
- Brush card support with respect to the rest of the motor is an elastomer that provides a seal and vibration dampener to reduce noise The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A brush card assembly comprising:
   a brush card member,
   conductive contacts provided on the brush card member,
   brushes mounted to be electrically in contact with the conductive contacts, and
   a brush box associated with each of the brushes, the brush box including an integral spring constructed and arranged to bias the associated brush to contact a commutator, and an integral retainer structure constructed and arranged to exert pressure on the associated brush once the brush is disengaged from the commutator during operation of a motor which employs the brush card assembly, to minimize arcing between the brush and associated brush box,
   wherein the brush box, spring and retainer structure comprise a single part.

2. The assembly of claim 1, wherein the spring is a coil spring.

3. The assembly of claim 1, wherein the retainer structure includes a resilient arm disposed on at least one side of the brush box so as to exert lateral pressure on the associated brush.

4. The assembly of claim 3, wherein the resilient arm is of generally V-shape with an apex thereof engaging an associated brush.

5. The assembly of claim 4, wherein an apex of each arm engages a slot in an associated brush exerting lateral pressure on the brush, the slot extending an entire length of a brush on one side of the brush.

6. The assembly of claim 1, wherein the brush card member is a printed circuit board.

7. The assembly of claim 1, wherein the brushes are constructed and arranged to function properly without the use of shunts.

8. The assembly of claim 1, further comprising a support surrounding an entirety of the brush card member so as to seal a periphery of the brush card member.

9. The assembly of claim 8, wherein support is of elastomer material and is constructed and arranged to dampen vibration when the assembly is employed in a motor.

10. The assembly of claim 1, wherein the conductive contacts are printed circuit board traces.

11. The assembly of claim 8, wherein the support and brush card member are each insert molded members.

12. A brush card assembly comprising:
    a brush card member,
    conductive contacts provided on the brush card member,
    brushes mounted to be electrically in contact with the conductive contacts, and
    a brush box associated with each of the brushes, the brush box including an integral means for biasing the associated brush to contact a commutator, the brush box including integral means for exerting pressure on the associated brush once the brush is disengaged from the commutator during operation of a motor which employs the brush card assembly, to minimize arcing between the brush and associated brush box,
    wherein the brush box, means for biasing and means for exerting pressure comprise a single part.

13. The assembly of claim 12, wherein the integral means for biasing is a coil spring.

14. The assembly of claim 12, wherein the integral means for exerting pressure is a resilient arm disposed on at least one side of the brush box, the arm having an apex that contacts a slot in an associated brush exerting lateral pressure on the brush, the slot extending an entire length of each brush on one side of each brush.

15. The assembly of claim 12, wherein the brushes are constructed and arranged to function properly without the use of shunts.

16. A brush box assembly for a brush motor, the assembly comprising:
    a brush constructed and arranged to contact a commutator of a motor, and
    a brush box receiving the brush, the brush box including an integral spring constructed and arranged to bias the brush to contact the commutator, the brush box including an integral retainer structure constructed and arranged to exert pressure on the brush once the brush is disengaged from the commutator during operation of a brush motor which employs the brush box assembly, to minimize arcing between the brush and associated brush box,
    wherein the brush box, spring and retainer structure comprise a single part.

17. The assembly of claim 16, wherein the spring is a coil spring.

18. The assembly of claim 16, wherein the retainer structure includes a resilient arm disposed on at least one side of the brush box, the arm having an apex that exerts lateral pressure on the brush.

19. The assembly of claim 18, wherein the resilient arm is of generally V-shape.

20. The assembly of claim 19, wherein an apex of each arm engages a slot in the brush exerting lateral pressure on the brush, the slot extending an entire length of a brush on one side of the brush.

* * * * *